United States Patent [19]

Cheek et al.

[11] 4,157,537

[45] Jun. 5, 1979

[54] DISPLAY SYSTEM UTILIZING DIGITAL-ANALOG VECTOR GENERATION

[75] Inventors: Thomas B. Cheek; Douglas J. Doornink, both of Portland; Roger M. Handy, Hillsboro; David E. Heinen, Beaverton; Joseph H. Hubert, Wilsonville; Ronald J. Wilson, Oregon City, all of Oreg.

[73] Assignee: Tektronix, Inc., Beaverton, Oreg.

[21] Appl. No.: 677,947

[22] Filed: Apr. 19, 1976

[51] Int. Cl.[2] ........ G06F 3/14

[52] U.S. Cl. ........ 340/706; 178/15; 340/741; 340/797; 364/521

[58] Field of Search ........ 340/324 A, 324 AD; 178/15, 30

[56] References Cited

U.S. PATENT DOCUMENTS

| | | | |
|---|---|---|---|
| 3,491,200 | 1/1970 | Wisnieff | 340/324 A |
| 3,510,865 | 5/1970 | Callahan | 340/324 A |
| 3,716,705 | 2/1973 | Newell | 340/324 A |
| 3,848,246 | 11/1974 | Kendall | 340/324 A |

*Primary Examiner*—Marshall M. Curtis

*Attorney, Agent, or Firm*—Adrian J. LaRue; Thomas J. Spence

[57] ABSTRACT

A system wherein dynamic capability is incorporated into direct view storage tube terminals to provide both refreshed and stored information. More specifically, the system incorporates dynamic picture capability into direct view storage tubes by utilizing a constant rate vector generator, a high speed deflection system and a local digital memory operating simultaneously to enable refreshed and stored vectors to be simultaneously displayed.

3 Claims, 6 Drawing Figures

DISPLAY SYSTEM UTILIZING DIGITAL-ANALOG VECTOR GENERATION

BACKGROUND OF INVENTION

In the past, the direct view storage tube has become a familiar component in processing systems incorporating graphic display terminals. This popularity is, of course, because the cost incured to provide excellent image presentations is quite low. This is possible because as fully explained in U.S. Pat. No. 3,293,473 to Robert H. Anderson, the direct view storage tube can store images directly on its screen without refreshing. This has allowed the use of low speed deflection amplifiers thereby permitting the manufacture of the graphic terminal at substantially less cost than conventional terminals. Additionally, because data can be continuously added to a direct view storage tube, very complex images can be displayed.

A minor disadvantage with processing systems utilizing these above-mentioned direct view storage tubes, however, is that the stored images are static. Information may be continually added, but to remove a single element of information requires that the entire image be erased and all elements except the deleted item be rewritten. As is well known, this involves an erase procedue in which the entire screen is illuminated briefly and requires a varying amount of rewrite time depending on the data source and deflection system used. Since systems utilizing such storage tubes usually do not have any local memory associated therewith and their deflection systems are limited, this rewrite time may range up to tens of seconds. Clearly such delays are distracting to a user and dynamic displays with moving or rotating objects are seldom attempted. Dynamic images, on the other hand, are more easily generated on the more costly conventional cathode ray tubes having local memories and operated to write the image 30 to 60 times per second, as is well known.

As a result of the distinct performance difference associated with dynamic images, the user is affixed to a system utilizing the high capacity direct view storage tubes for static images or to a system utilizing a refreshed cathode ray tube for providing dynamic image capability.

In reality, there has always been a method in which dynamic capability may be incorporated into the direct view storage tubes. Such method is the so called ¢Write-Through" which is the operation of a direct view storage tube to produce a non-stored image during storage of another image as fully explained in U.S. Pat. No. 3,430,093 to C. N. Winningstad. Unfortunately, because of a desire to keep costs to a minimum, this mode of operation has never been utlized to its fullest potential, a clear disadvantage.

SUMMARY OF INVENTION

Accordingly, the present invention is directed to a system wherein dynamic capability is added to the direct view storage tube thereby permitting interactive processing of graphic and/or alphanumeric information overcoming the disadvantages of the prior art.

Basically, the system consists of a minicomputer, random access memory, a microcoded display controller and a refreshed/storage display unit. On command from the minicomputer, the display controller accesses a display list in memory containing beam positioning and status information and directs the vector generation from which a picture is constructed. The vector generation from which the picture is constructed is provided by a constant rate vector generator using a linear approximation of a simple algorithm.

It is therefore, an object of the present invention to provide an improved direct view storage tube display system which permits simultaneous static and dynamic capabilities.

It is another object of the present invention to provide an improved system wherein dynamic capability is added to a direct view storage tube thereby processing graphic and/or alphanumeric information.

It is yet another object of the present invention to provide an improved system wherein a direct view storage tube is written through to produce dynamic capability which overcomes the disadvantages of the prior art.

It is still another object of the present invention to provide a constant rate vector generator using a linear approximation of a simple algorithm.

Additional objects and advantages of the present invention will be apparent from the following detailed description of the preferred embodiment of the present invention shown in the attached drawings. It is to be understood, however, that the various embodiments are not intended to be exhausting nor limiting of the invention but are given for purposes of illustration in order that others skilled in the art may fully understand the invention and principles thereof and the manner of applying it in practical use so that they may modify it in various forms, each as may be best suited to the conditions of the particular use.

DESCRIPTION OF INVENTION

Figure 1:
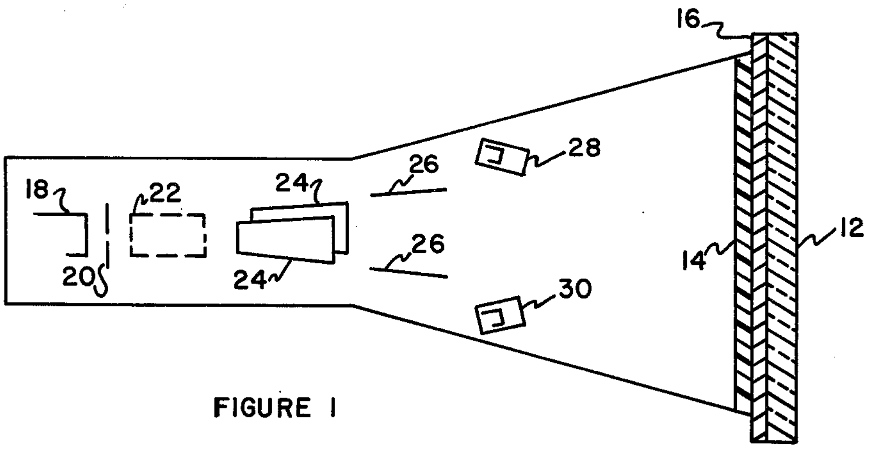
FIG. 1 shows a simplified view of a direct view storage tube.

A preferred embodiment of a direct view storage tube in simplified form is shown in FIG. 1 and is helpful in explaning the write-through phenomena utilized in the present invention. The tube 10 may be of the type described in the already mentioned U.S. Pat. No. 3,293,473 of R. H. Anderson or as described in U.S. Pat. No. 3,293,474 of C. B. Gibson, The Anderson tube has a storage target that includes a light-transparent support plate 12 of glass which may be the face plate of the tube envelope, a storage dielectric layer 14 of phosphor material coated on the support plate over a light-transparent conductive film 16, say, of tin oxide. The conductive film 16 serves as the target electrode and as a collector of the secondary electrons emitted by the storage dielectric providing such dielectric is in the form of separated dots or an integral layer sufficiently porous to enable such secondary electrons to be transmitted therethrough. The phosphor material can be, for example, as fully described in co-pending application Ser. No. 356,029 filed Apr. 30, 1973, now U.S. Pat. No. 3,956,662 or in co-pending application Ser. No. 658,977 filed Feb. 18, 1976 assigned to the assignee of the subject invention.

The storage tube, tube 10, also includes a writing gun comprising a cathode 18, a control grid at 20, and a focusing and accelerating anode structure 22 for forming a narrow writing beam of high velocity electrons which are caused to strike the storage dielectric 14. The writing beam is deflected by signals (not shown) applied to a pair of horizontal deflection plates 24 and a pair of vertical deflection plates 26 provided within the storage tube. (The writing beam may also be deflected by having external coils surrounding the cathode ray tube as is well known.) A pair of flood guns 28 and 30 are provided within the storage tube to uniformly bombard the storage dielectric 14 with low velocity flood electrons to cause bistable storage in a conventional manner of any charge image formed thereon whose potentials are greater than the critical minimum voltage necessary for bistable storage. (It should be noted that a single flood gun can be utilized rather than the pair of flood guns 28 and 29.)

Figure 2:
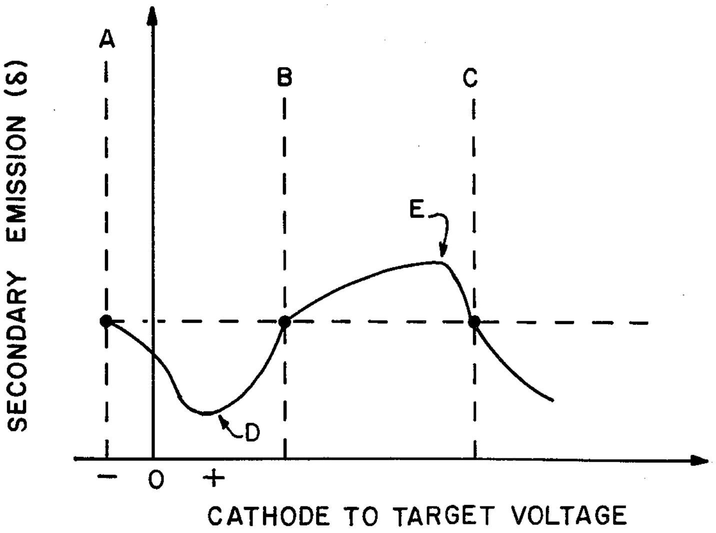
FIG. 2 is a plot of the secondary emission characteristics of a conventional direct view storage tube.

Referring now to FIG. 2 there is shown a plot of the secondary emission characteristics of a conventional direct view storage tube. As is well known, when the high velocity electrons strike the storage dielectric other electrons are separated therefrom, which number depends upon the number of the striking electrons, the velocity of the striking electrons, the target composition and surface condition, etc. The amount of secondary emission is usually expressed as a ratio of the secondary-emission current to primary beam current and is termed the secondary emission ratio or delta ($\delta$); delta is shown plotted on the ordinate axis. As is also well known, the target voltage relative to the cathode determines the primary electron potential i.e., electron potential equals target voltage less cathode voltage; such cathode to target voltage is shown plotted on the abscissa. At some point say, along dashed line A which is substantially below zero volts, the target is surrounded by a repelling field which reflects all the primary beam current. At this voltage, the target has an apparent or a net effective secondary ratio of 1. As the cathode to target potential is increased more positive some of the primary electrons are absorbed by the target without producing any secondary emission so that delta decreases to a minimum point D on the curve. As the cathode to target potential becomes still more positive, some of the primary electrons strike the target with sufficient velocity so that a true secondary emission causes delta to increase to a first cross-over point indicated by dashed line B where delta equals 1. When the cathode to target potential is increased above that required to produce a first cross-over point, delta increases above 1 to a maximum E since the primary electrons strike the target with more energy and each of such primary electrons produces more than 1 secondary electron at these target voltages. Above the voltage represented by E, an increase in the cathode to target voltage causes such primary electrons to penetrate deeper into the dielectric so that the secondary electrons are absorbed within the target. This causes delta to decrease until it reaches unity at delta equal 1, a second crossover point indicated by the dashed line C. Above the second crossover, delta decreases to a value less than 1.

As can be discerned from the plot of FIG. 2, if delta averages less than 1, the target gains a net negative charge and its potential becomes more negative. Similarly, if the average number of delta exceeds 1, the target gains a net positive charge and its potential becomes more positive. Thus, when the potential lies between the dashed lines A and B and the target is additionally and uniformly bombarded with low velocity flood electrons, the potential of the target becomes more negative tending to move delta towards the value 1 along the line A. If the potential lies between the dashed lines B and C, the potential becomes more positive during bombardment and tends to move delta towards a value of 1 along the line C. Similarly, a potential more negative than the line A or more positive than the line C causes the potential to move to A or C, respectively. This means, therefore, that there are two stable points on the curve, A and C. Also, the flood electrons striking the target in such a manner as to move delta equals 1 at line C does so with enough energy to emit light whereas moving delta equal 1 at line A will not emit light. This ability to have the cathode to target voltage remain in one of two stable states, one of which emits light and the other not emitting light, is the basis for the bistable direct view storage tube.

As can be discerned, causing the target potential to move from dashed line A to C, to store, depends upon the number of electrons supplied whereas the light emitted during the write process depends on the energy of the electrons. This means that if relatively few electrons are supplied, the target will be illuminated but will not be written permanently. This phenomena is known as write-through and can be used to display images which are not planned to be permanent along with concurrently stored images. Such write-through is fully described in the already mentioned U.S. Pat. No. 3,430,093 to C. N. Winningstad and as such will not be described in detail.

Figure 3:
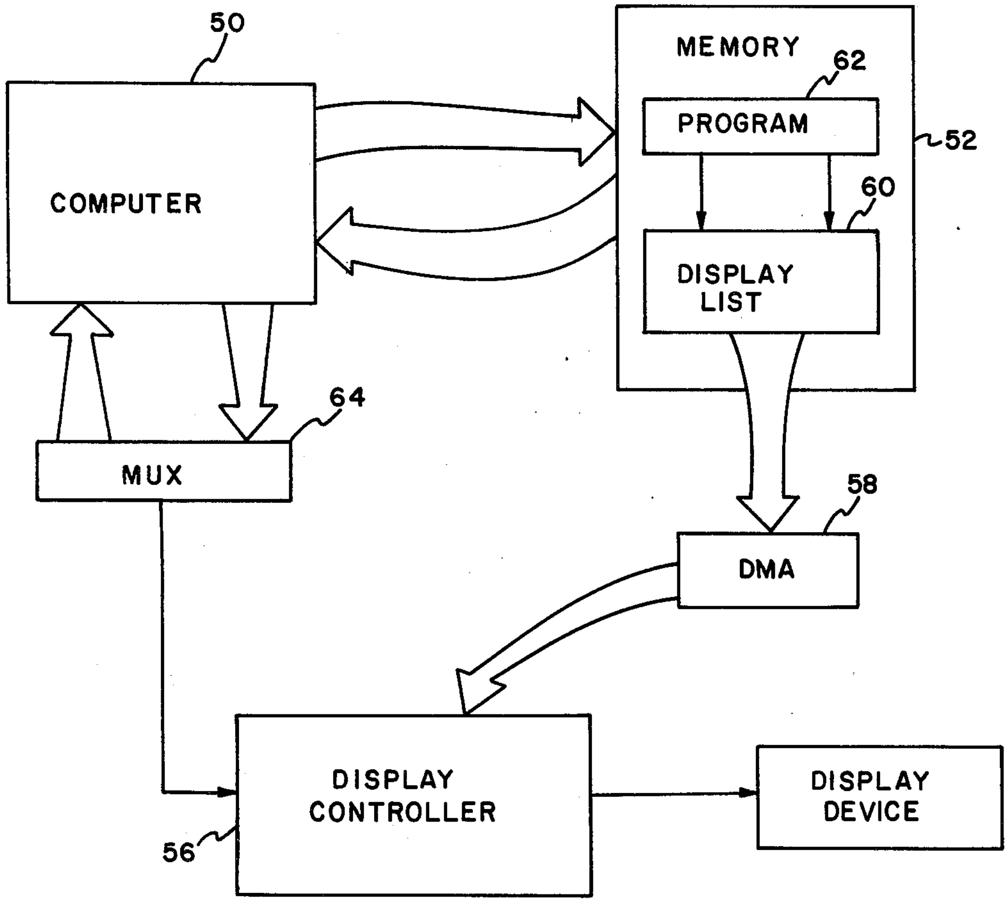
FIG. 3 diagrams the hardware for intermixing refreshed and stored images on a direct view storge tube.

Referring now to FIG. 3, there is shown the hardware for intermixing refreshed and stored images i.e., adding dynamic capability to display devices which receive electrical input signals and will store such signals for an indefinite controllable time in accordance with the present invention. It can be seen from this diagram that the hardware consists of a mini-computer 50, a memory 52, display controller 56, and the display unit. On command from the mini-computer, the display controller accesses the display list in memory via a high speed direct memory access (DMA) channel 58. The display list 60 contains beam positioning and status information under the control of a program unit 62. The display controller directs the vector generation from which a picture is constructed. A multiplexer (MUX) channel 64 is provided for inputing data via peripherals.

The above-listed hardware including various peripherals such as, for example, floppy discs, keyboards, tapes, joy sticks, etc., are well known to those having ordinary skill in the art. As such, the present invention is an improvement over the prior art in that the display controller 56 utilized therein permits the operation of display device as already set forth to its fullest potential.

Before considering the display controller in detail, certain characteristics to properly operate the display means will be detailed. For example, how much data can be displayed in a write-through mode and how much brighter the data will be when displayed. Parameters that can be controlled are the energy of the write electrons, the number of write electrons, and the rate of motion of the write beam. These parameters or variations thereof must, of course, be consistent with the bistable operation of the display means, the life of the cathode ray tube, etc.

It is reasonable to want to maximize write electron energy and minimize their number to increase write-through brightness without causing storage. However, there are factors that limit the writing gun voltage. Additionally, beam current is limited to obtain good spot sizes and an acceptable stored writing rate. Beam motion is, of course, one of the easiest parameters to control and can be readily used to control how much charge is deposited on the target per unit area, and it is highly desirable to keep the beam rate constant to accurately control the charging rate and to keep beam intensity constant.

Measurements show that a charge of $1.6\times10^{-9}$ coulombs per $cm^2$ is required to drive the phosphor of a typical storage dielectric from non-storage to storage, whereas less than $1.6\times10^{-9}$ coulomb per $cm^2$ will cause the phosphor to be illuminated and then return to nonstorage. In a typical direct view storage tube, say, having a 19-inch screen, the write beam has a cross section of about 0.005 $cm^2$ at a beam current of about 10 microamps when operated with a cathode to target potential of about 6000 volts. This gives a current density of about 20,000 microamps per $cm^2$. As such, the secondary emission (δ) is about 1.2 for about 6,000 volt electrons. This means that 1.2 electrons are freed from the target dielectric for every electron that strikes the dielectric. Therefore, the net or effective charge rate is 20% of the beam current or about 4,000 microamps per $cm^2$. As previously mentioned, flood guns uniformly bombard the dielectric which add to the beam current. However, this flood current is only about 30 microamps per $cm^2$ so that the write current completely dominates the charge rate of its target dielectric.

Having now described the effective charge rate of the beam current, it is possible to estimate the time constant for writing a unit area of phosphor by:

$$\text{Time} = \text{Charge/Current Density} \tag{1}$$

$$T = \frac{1.6\times10^{-9}\ \text{coulombs}}{4\times10^{-3}\ \text{amp/cm}^2}$$

$$T = 0.4\times10^{-6}\ \text{seconds.}$$

Assuming that an image will be refreshed 30 times per second to avoid flicker and that such target element will be rewritten for the above calibrated time using about a 6,000 volt beam having an approximate 20,000 microamps per $cm^2$ current density, it can be assumed that all beam energy is given up to the phosphor.

From published charts on the efficiency of, say, P1 phosphor conventionally used with direct view storage tubes, the brightness thereof in refreshed mode can be predicted by:

$$\text{Brightness} = (\text{efficiency})\left(\frac{\text{input energy}}{\text{unit area}}\right)(\text{duty cycle}) \tag{2}$$

$$\text{Brightness} = \left(\frac{1\times10^{4}\ \text{ft-Lambert}}{\text{watt/cm}^2}\right)\left(\frac{12\times10^{5}\ \text{volt-amp}}{\text{cm}^2}\right)(1.2\times10^{5})$$

$$\text{Brightness} = 14.4\ \text{ft.-Lamberts.}$$

As the brightness is somewhat equivalent to the brightness of typical stored images, the refreshed and stored images will appear to have equal brightnesses.

As was previously mentioned, charge deposition is controlled by controlling the rate of motion of the writing beam. The desired rate can be calculated by:

$$\text{Rate (cm/sec)} = \frac{(\text{beam current})(\delta - 1)}{(\text{charge density})(\text{beam width})} \tag{3}$$

$$\text{Rate} = \frac{(1\times10^{-5}\ \text{amp})(1.2-1)}{(1.6\times10^{-9}\ \text{amp}\cdot\text{sec/cm}^2)(0.025\ \text{cm})}$$

$$\text{Rate} = 50{,}000\ \text{cm/sec.}$$

Clearly, such a rate is sufficient for drawing vectors representative of complex images.

Finally, it must be determined how long the target dielectric must "rest" before trying to refresh a given phosphor a second time. This is pertinent because if the flood guns do not drive the particle back to a non-store potential before the writing beam strikes it, the particle may integrate the charge and "push the potential above the store threshold". As the flood electrons remove charge at a rate depending on the secondary emission ratio (an average ratio of about 0.75 between the dashed lines A and B of FIG. 2) and is about 30 microamp per $cm^2$, the discharge time is given by:

$$\text{Discharge Time} = \frac{\text{stored charge/cm}^2}{\text{effective flood current/cm}^2} \tag{4}$$

$$\text{Discharge Time} = \frac{1.6\times10^{-9}\ \text{amp}\cdot\text{sec/cm}^2}{(30\times10^{-6}\ \text{amps/cm}^2)(1-.75)}$$

$$\text{Discharge Time} = 2.13\times10^{-4}\ \text{sec.}$$

Thus, it is seen that if a given particle is not rewritten in about b 200 microseconds, such charging above the stored potential will not be produced.

It should be noted that these described characteristics obtained from simplified calculations are in fact representative of a very complex phenomena.

Figure 4:
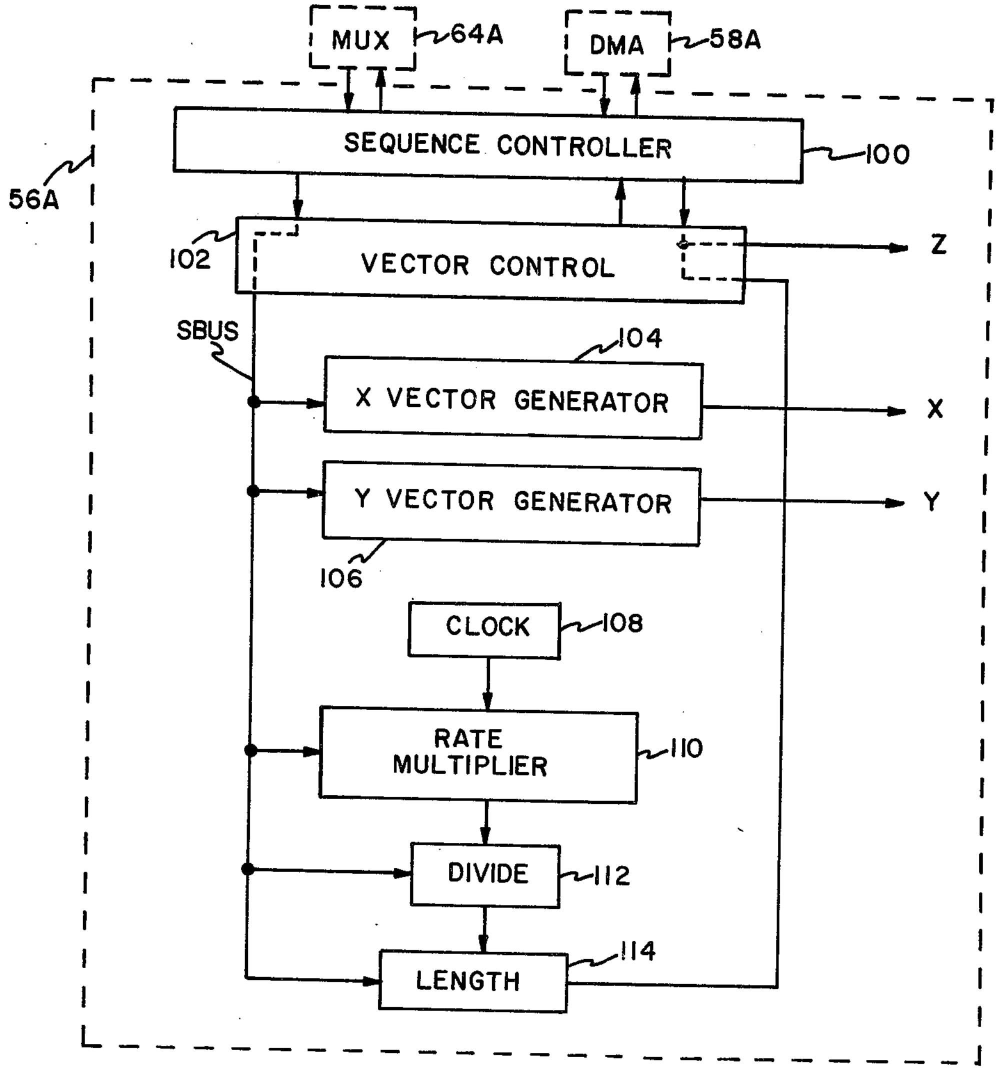
FIG. 4 is a block diagram of the display controller in accordance with FIG. 3.

Referring now to FIG. 4, there is shown a more detailed diagram of the display controller in accordance with the present invention, and it is the purpose of the display controller to provide the control functions and data representative of the above-discussed characteristics to permit interactive processing of graphical and/or alphanumeric information. The display controller is seen to comprise a sequence controller 100 having architecture to handle data applied thereto via the DMA and MUX channels 58A and 64A, respectively. (So that like components can be identified between the various drawings, such components have hereinafter been assigned the same reference numerals but a suffix has been added.) The sequence controller can be any microprocessor or computer in that the type of functions required to be performed are standard. As such, the sequence controller 100 could be, for example, as shown in FIG. 5.

Figure 5:
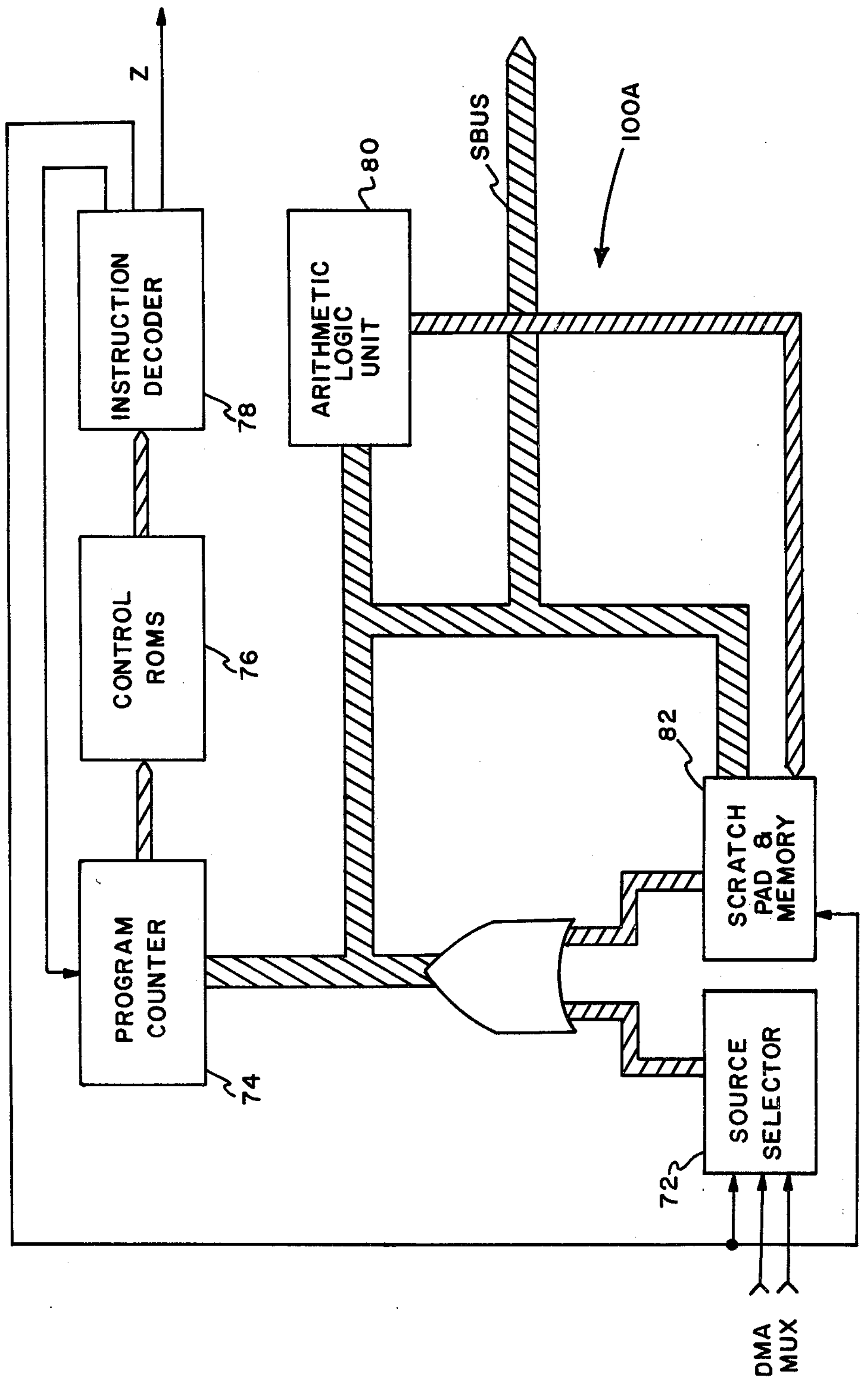
FIG. 5 is a diagram of the sequence controller portion of the FIG. 4 embodiment.

In the FIG. 5 embodiment, the controller includes a source selector 72 to select information via the MUX and DMA channels, program counters 74 responsive to the selected information to sequence data stored in firmware such as control read only memories (ROMS) 76, instruction decoders 78 for latching the data stored in the firmware, an arithmetic logic unit (ALU) 80 for performing all calculations necessary, and a scratch pad and memory unit 82 for storing the results, or intermittent results, of the computations. As these portions of the sequence controller 100 are well known to those skilled in the art, no detailed description thereof will be provided.

The data and control functions provided by the sequence controller are then applied to a vector control means 102. Vector control means 102, in turn, utilizes the information provided thereto to generate the necessary timing signals, Z-axis control for the display device, display mode control, etc. For example, the vector control may get a command from the sequence controller that will permit a vector to be drawn on the display device. Thus, the vector control will generate the necessary timing signals to permit the vector to be drawn as well as the necessary axis control signal to properly modulate the beam of the display device. Once these functions are performed, the vector control signals the sequence controller that the necessary functions have been performed allowing the controller to receive further instructions.

Figure 6:
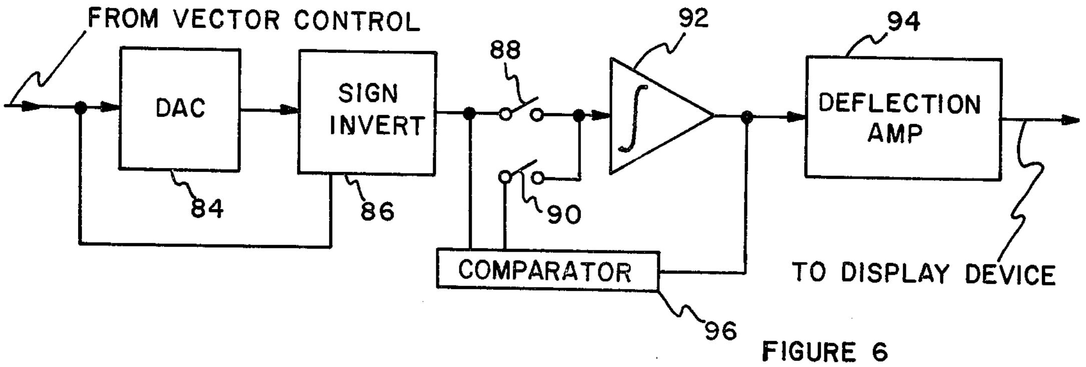
FIG. 6 is a diagram of the vector generator portion of the FIG. 4 embodiment.

Responsive also to the data and instructions from the sequence controller 100, and under the control of the vector control 102, are the X and Y vector generators 104 and 106 respectively. These generators provide deflection control of the display device using the information provided thereto to enable storage, write-through, or both. As best shown in FIG. 6, each generator is seen (only one is shown as both X and Y generators are identical) to include a digital to analog converter (DAC) 84, a sign inversion stage 86, an integrator 92, deflection amplifier 94, comparator 96, and a pair of switches 88, 90. In accordance with the subject invention, these integrators have outputs given by:

$$\text{volts} = \frac{(Vdac)(T)}{RC}, \tag{5}$$

Where T equals the integration time period, RC equals the integration time constant, and Vdac equals the digital analog output voltage. If T is set proportional to vector length so that:

$$T = (K)\sqrt{(X^2 + Y^2)} \tag{6}$$

Where X and Y are relative Cartesian coordinates, then the digital to analog converter output is set by:

$$Vxdac = \frac{(Vxout)(RC)}{(K)\sqrt{(X^2 + Y^2)}} \text{ and} \tag{7}$$

$$Vydac = \frac{(Vyout)(RC)}{(K)\sqrt{(X^2 + Y^2)}}, \tag{8}$$

where K is a proportionality constant.

Unfortunately, microprocessors have trouble in rapidly performing divisions and square functions whereas analog "square-rooters" used with conventional multiplying digital to analog converters are expensive as is a read only memory (ROM) used as a look-up table in which all solutions could be calculated and stored. Thus, the microprocessor of the present invention executes a rather simple linear approximation in which vector length is estimated by adding one half the smaller displacement to the larger displacement. This simpler algorithm is easily handled by the microprocessor and provides minimum error. Such algorithm is given by:

$$\text{Length} = |\text{larger } \Delta| + |\tfrac{1}{2} \text{ smaller } \Delta|, \tag{9}$$

where Δ equals the displacement of the vector.

As this algorithm is necessary for the generation of constant rate vectors, it will now be discussed in detail before proceeding with the description of the vector generators. Assume, for example, that it is desired to draw a vector on the screen of the display device from a known point, say 256 units in the X direction and 128 units in Y as an example. It is well known from Pythagorean's theorem that the length of the vector drawn will be:

$$L = \sqrt{X^2 + Y^2} \tag{10}$$

$$L = \sqrt{(256)^2 + (128)^2}$$

$$L = 286.21670 \text{ units.}$$

However, according to the algorithm utilized in the present invention, the length estimate ($L_E$) of such vector is:

$$L_E = |\text{larger } \Delta| + |\tfrac{1}{2} \text{ smaller } \Delta| \tag{11}$$

$$L_E = 256 + (\tfrac{1}{2})(128)$$

$$L_E = 320 \text{ units.}$$

The estimate, $L_E$, is then left justified (normalized) to provide a justified length estimate ($L_{EJ}$) given by:

$$L_{EJ} = (L_E)(2^n) \tag{12}$$

$$L_{EJ} = (320)(2^2)$$

$$L_{EJ} = 1280 \text{ units,}$$

where $1024 \leqq LEJ \leqq 4096$ and $0 \leqq n \leqq 11$. The range of $L_{EJ}$ and n were selected to provide an optimum writing rate.

Next, since an estimate is being used for the length, a correction factor must be obtained. This correction factor ($C_F$) is given by:

$$C_F = K_1/L_{EJ} \tag{13}$$

$$C_F = 2047/L_{EJ}$$

$$C_F = 2047/1280$$

$$C_F = 1.59375$$

where $K_1$ is a proportionality constant to provide the highest average of voltage from the digital to analog converters and $1 \leqq C_F \leqq 2$. Following this step, the initial X and Y directions are also left-justified (normalized) such that:

$$X_J = (X)(2^n) \tag{14}$$

$$Y_J = (Y)(2^n),$$

where $X_J$ and $Y_J$ are the justified lengths and n is as before. In the example of X equal 256 and Y=128, $X_J$ equals 1024 and $Y_J$=512.

The final computation of the algorithm is to determine the X and Y values applied to the DAC's. This computation is given by:

$$X_{DAC} = (X_J)(C_F) \tag{15}$$

$$Y_{DAC} = (Y_J)(C_F).$$

In the example being presented, $X_{DAC}$ equals 1632 and $Y_{DAC}$ equals 816 (rounded to the nearest whole number). Therefore, the algorithm utilized provides valves corresponding to $X_{DAC}$, $Y_{DAC}$, $D_F$ and n. These values are utilized by the remaining stages of the display controller to generate the constant rate vectors required. In the preferred embodiment, these values are applied to the remaining stages via the SBUS in the form of 12 bit signed values for $X_{DAC}$, $Y_{DAC}$, a 6 bit value for $C_F$ and a 4 bit value for n.

Although not shown in the drawings, the DAC's include latches or registers that remember the value of the data and hold such data the entire duration of a vector. This is necessary in that the data from sequencer is constantly changing. Once the information is latched in the digital to analog converter, $V_{XDAC}$ and $V_{YDAC}$ voltages are generated. This data, in the form of an analog voltage, is converted to either a plus or a minus signal by a sign invert stage 102 under the control of the sign bit included as a portion of the data from the sequencer. The sign inverter stage 86 is well known to those skilled in the art and by providing either a positive or a negative analog voltage, it is possible to make the integrator go in a positive direction or, by changing the sign bit, the vector can be made to go completely backwards from the direction it would normally go.

Returning once again to FIG. 6, the 12 bit signed value is simultaneously applied to the DAC's 84 and the sign invert stage 86. The analog voltages provided by the DAC's, hence the output of stage 86 has magnitude given by:

$$V_{XDAC} = K_2 X_{DAC} \qquad (16)$$

and $$V_{YDAC} = K_2 Y_{DAC},$$

where $K_2$ is a proportionality constant of the DAC's to map the binary numbers into corresponding analog voltages. The magnitude of these voltages determines the speed that the integrator is going to integrate and the slope of the ramp it generates and therefrom, the speed of the vector.

The analog voltages produced at the output of stage 86 are applied via the switch 88, which is any conventional electronic switch electronically timed from the vector control to close such switch after a slight delay allowing the data to be latched into the DAC's, to a conventional integrater 92 which integrates the voltage and provides to the deflection amplififer 94 a ramp signal of constant velocity. Amplifier 94, in turn, is connected to the display device which causes the beam to be deflected, hence draw the vector. As the integrator and deflection amplifier are well known to those having skill in the art no detailed description will provided therefore. At the end of the vector, the switch 88 is again opened and at this time the switch 90 is closed simultaneously therewith, the sequencer updates the DAC's and a new analog voltage is propagated through the sign inverter. This new analog voltage is compared with the output of the integrator via the comparator 96 and sets an update phase wherein the output of the sign inverter is compared to the output of the integrator and feedback causes the integrator to get that voltage so that the integrator is forced to a certain voltage. Once the integrator is forced to the certain voltage, switch 90 is again opened and the digital to analog converter 84 receives new data to again generate a new vector. This time, however, the generation of the new vector being from a point as set by the update. It should be mentioned that the switch 90 is also under the control of the vector control and is closed only after the already discusseed latches of the digital analog converter have latched the update information.

Referring once again to FIG. 4, the display controller is also seen to comprise a clock 108 whose output is applied to a rate multiplier 110, simultaneously receives the 6 bit correction factor previously discussed. The rate multiplifer 110 in turn, modifies the frequency generated by the clock which is initialized by the correction factor. In the preferred embodiment clock 108 is preferably a conventional crystal oscillator free running at about 12 megahertz and rate multiplier 110 is a conventional and commercially available 7497. The output of rate multiplier 110 which can vary between 6 and 12 megahertz is applied to a divide stage 112. Stage 112 is preferably a 74161 counter under the control of the vector control to divide the output of the rate multiplier by 4 in a write-through mode or divide the output of rate multiplier 110 by 16 in a store mode. The output of the divide stage 112 is next applied to a length control 114 which also receives the 4 bit n factor. Basically the length stage 114 multiplies the output of the divide stage 112 by a factor of $2^n$ to provide therefrom a signal which is applied to the vector control to properly time the Z axis modulation signal in accordance therewith. Thus, simultaneously with the generation of the vector drawn on the display the Z axis is modulated in accordance with the correction factor and normalization factor to properly display the vector.

Therefore, by combining the 4 algorithm numbers in accordance with the present invention to provide digital rate correction giving the capability of constant velocity vectors enables more write-through to be displayed on stored information; an improvement of the prior art.

To fully understand that constant rate vectors are being generated, the following mathematical analysis should be considered. The integration time of the integrators can now be defined as:

$$T = \frac{K_3}{(C_F)(2^n)}, \qquad (17)$$

where T, $C_F$, n are as previously defined and $K_3$ is another proportionality constant which relates $C_F$ and n to a time it takes to write a vector. Also, since writing rate $W_R$ is:

$$W_R = \sqrt{Vx^2 + Vy^2}\text{, and writing length } W_L \text{ is:} \qquad (18)$$

$$W_L = (T)\,(W_R)\text{, then} \qquad (19)$$

$$W_R = \sqrt{(K_2 X_5 C_F)^2 + (K_2 Y_J C_F)^2} \qquad (20)$$

$$W_R = \sqrt{\left(\frac{(K_2)(X)(2^n)(K_1)}{L_{EJ}}\right)^2 + \left(\frac{(K_2)(Y)(2^n)(K_1)}{L_{EJ}}\right)^2}$$

$$W_R = \frac{(K_2)(2^n)(K_1)}{L_{EJ}} \sqrt{X^2 + Y^2}$$

$$W_R = \left(\frac{K_1 K_2}{L_E}\right)(L).$$

Therefore, $W_L = (T)\,(W_R)$ $$W_L = \left(\frac{2^n L_E K_3}{K_1 2^n}\right)\left(\frac{K_1 K_2 L}{L_E}\right)$$

$$W_L = K_2 K_3 L.$$

While there has been shown and described the preferred embodiments of the present invention, it will be apparent to those skilled in the art that many changes and modifications may be made without departing therefrom in its broader aspects. Therefore, the appended claims are intended to cover all such changes an modifications as fall within the true spirit and scope of this invention.

The invention is claimed in accordance with the following:

1. A display system utilizing digital-analog vector generation to provide both refreshed and stored information simultaneously to a direct view storage tube, the system comprising:

a computer for supplying and controlling data to be displayed, said computer also being being conditioned to initiate system operation;

a memory coupled to receive and store said data, said memory including a display list containing vector position and status information and a program for controlling said position and status information;

a display controller operatively coupled to said memory and to said computer for receiving said position and said status information, said controller directing vector generation to jointly provide the refreshed and stored information in the form of electric signals, said controller including:

digital signal processor means for manipulating said data to provide a plurality of related signals for rate correcting a pair of vector generators, and a pair of analog vector generators responsive to said plurality of related signals for generating constant velocity vectors, said constant velocity vectors corresponding to said electric signals; and a direct view storage tube for receiving said electric signals and providing a display in accordance therewith, said display being refreshed and stored simultaneously.

2. The system according to claim 1 wherein said digital processor means further comprises:

means for generating a linear approximation number representative of vectors from which the display is constructed;

means for normalizing said linear approximation number to provide a normalization number;

means for correcting said normalized number to provide a correction factor;

means for normalizating said position number to provide a normalized position number; and means for combining said linear approximation number, said normalization number, said correction factor, and said normalized position number to provide rate correction of the vector generation.

3. The system according to claim 1 wherein said digital signal processor means and said analog vector generator cooperate so that said digital processor means is manipulating the data of a subsequent vector to be displayed simultaneously with said analog vector generator outputting a current vector being displayed.

* * * * *

UNITED STATES PATENT AND TRADEMARK OFFICE

CERTIFICATE OF CORRECTION

PATENT NO. : 4,157,537

DATED : June 5, 1979

INVENTOR(S) : Thomas B. Cheeks, et al.

It is certified that error appears in the above-identified patent and that said Letters Patent are hereby corrected as shown below:

Column 1, Line 49, "¢Write-Through" should be --"Write Through"--.

Column 6, Line 29, "b 200" should be --200--.

Column 6, Line 62, "are well known" should be --are all well known--.

Column 8, Line 43, "$\leqq 2$" should be --$<2$--.

Column 8, Line 26, "$\leqq 4096$" should be --$<4096$--.

Signed and Sealed this

*Thirteenth* Day of *January 1981*

[SEAL]

*Attest:*

SIDNEY A. DIAMOND

*Attesting Officer* *Commissioner of Patents and Trademarks*